United States Patent
Demont et al.

(10) Patent No.: US 8,523,109 B2
(45) Date of Patent: Sep. 3, 2013

(54) AIRFRAME INCLUDING CROSSMEMBERS FOR FIXING SEATS

(75) Inventors: Benoit Demont, Pibrac (FR); Sebastien DeConto, Bretx (FR); Roland Grillon, Tournefeuille (FR)

(73) Assignee: Airbus Operations (S.A.S.), Toulouse (FR)

( * ) Notice: Subject to any disclaimer, the term of this patent is extended or adjusted under 35 U.S.C. 154(b) by 23 days.

(21) Appl. No.: 13/174,847

(22) Filed: Jul. 1, 2011

(65) Prior Publication Data
US 2012/0074259 A1 Mar. 29, 2012

Related U.S. Application Data

(63) Continuation of application No. PCT/FR2010/050128, filed on Jan. 27, 2010.

(30) Foreign Application Priority Data

Jan. 29, 2009 (FR) ...................................... 09 50556

(51) Int. Cl.
*B64C 1/18* (2006.01)
*F16D 3/00* (2006.01)

(52) U.S. Cl.
USPC ........................... 244/118.1; 244/119; 403/57

(58) Field of Classification Search
USPC ................ 244/118.1, 118.5, 118.6, 119, 120; 403/53, 57, 58, 62; 52/167.4, 506.05, 702
See application file for complete search history.

(56) References Cited

U.S. PATENT DOCUMENTS

| | | | | |
|---|---|---|---|---|
| 4,479,621 A | * | 10/1984 | Bergholz | 244/118.1 |
| 5,083,727 A | | 1/1992 | Pompei et al. | |
| 5,383,630 A | * | 1/1995 | Flatten | 244/118.6 |
| 6,068,214 A | * | 5/2000 | Kook et al. | 244/118.1 |
| 6,219,983 B1 | * | 4/2001 | Gråkjaar | 244/118.6 |
| 7,163,178 B2 | * | 1/2007 | Ricaud | 244/118.1 |

(Continued)

FOREIGN PATENT DOCUMENTS

| | | |
|---|---|---|
| EP | 1 564 141 A | 8/2005 |
| FR | 2 887 849 A1 | 1/2007 |
| FR | 2 900 125 A1 | 10/2007 |
| WO | WO2007447962 | * 11/2007 |

OTHER PUBLICATIONS

International Search Report for PCT Application No. PCT/FR2010/050128 dated May 25, 2010.

*Primary Examiner* — Joseph W Sanderson
*Assistant Examiner* — Marc Burgess
(74) *Attorney, Agent, or Firm* — Jenkins, Wilson, Taylor & Hunt, P.A.

(57) ABSTRACT

The invention relates to an airframe having a substantially circular cross section in a lateral direction (Y) and which extends in the longitudinal direction (X). The airframe comprises, a plurality of rails for supporting seats, each rail being parallel to the longitudinal direction (X) of the airframe, a plurality of beams parallel to the rails; and a plurality of crossmembers aligned, in use, in the lateral direction (Y) of the airframe. Each crossmember supports only some of the successive rails, each crossmember being supported by only some of the successive beams in the lateral direction (Y) of the airframe with the beams forming part of a wing box and/or a main landing gear well of the airframe. Each crossmember comprises at least one connection to each of the beams that support it where each connection comprises at least one articulation about at least one axis.

8 Claims, 5 Drawing Sheets

(56) References Cited

U.S. PATENT DOCUMENTS

| | | | |
|---|---|---|---|
| 7,857,259 B2 * | 12/2010 | Baatz et al. | 244/118.6 |
| 2005/0109877 A1 * | 5/2005 | Williamson et al. | 244/118.1 |
| 2007/0007392 A1 * | 1/2007 | Huber et al. | 244/137.1 |
| 2007/0080258 A1 | 4/2007 | Baatz et al. | |
| 2009/0294587 A1 | 12/2009 | Ricaud et al. | |
| 2009/0302157 A1 | 12/2009 | Ricaud | |
| 2011/0001006 A1 * | 1/2011 | Delahaye et al. | 244/118.5 |

* cited by examiner

AIRFRAME INCLUDING CROSSMEMBERS FOR FIXING SEATS

CROSS-REFERENCE TO RELATED APPLICATIONS

This application is a continuation of PCT/FR2010/050128, filed Jan. 27, 2010, and claims the benefit of and priority to French Patent Application No. 0950556, filed Jan. 29, 2009, the entire disclosures of which are herein incorporated by reference.

FIELD OF THE INVENTION

The invention concerns airframes, notably aircraft. It concerns more specifically the architecture of the fuselage.

TECHNICAL BACKGROUND

It is desirable for the cabin arrangements of a civil airliner to have some flexibility. Accordingly, the passenger seats being supported by longitudinal rails, it is advantageous to be able to modify the transverse position of the rails relative to the median vertical longitudinal plane of the cabin.

In an ordinary section of the fuselage, this does not give rise to any particular difficulty. The rails conventionally rest on crossmembers that extend perpendicularly to the longitudinal direction of the fuselage and are supported on lateral portions of the fuselage. Thus whatever the position required for the seat rails, the rails rest on the crossmembers.

Things are different in some particular sections of the fuselage. This is the case of the wing box that lies in the fuselage aligned with the wings. This is also the case of the main landing gear well accommodating the main landing gear supporting the fuselage directly. In these two particular areas, the structure of the fuselage includes beams extending in the longitudinal direction of the fuselage: these are beams in the case of the wing box and gantries in the case of the main landing gear well. In these two areas, the architecture of the fuselage and transverse deformations to which it is liable to be exposed prohibit fitting the aforementioned crossmembers. This is why, in these areas, the rails are carried by links themselves carried by the longitudinal beams. It is therefore the position of the latter that conditions the position of the rails in the transverse direction, which therefore cannot be chosen at will.

This architecture also prohibits subsequent modification of the position of the rails. Thus customers such as the airlines are not able to customize the cabin in these areas.

An object of the invention is therefore to improve the flexibility of the cabin arrangements, notably at the level of the wing box and the main landing gear well.

SUMMARY OF THE INVENTION

To this end, the invention provides an airframe having a substantially circular cross section in a lateral direction (Y) and which extends in the longitudinal direction (X), the airframe comprising, a plurality of rails for supporting seats, each rail being parallel to the longitudinal direction (X) of the airframe, a plurality of beams parallel to the rails; and a plurality of crossmembers aligned, in use, in the lateral direction (Y) of the airframe, each crossmember supporting only some of the successive rails, each crossmember being supported by only some of the successive beams in the lateral direction (Y) of the airframe, the beams forming part of a wing box and/or a main landing gear well of the airframe, characterized in that each crossmember comprises at least one connection to each of the beams that support it where each connection comprises at least one articulation about at least one axis.

It is therefore a question of partial crossmembers or "mini-crossmembers" that have a low inertia.

Accordingly, in the areas featuring the mini-crossmembers, the seat rails may occupy many transverse positions as they continue to bear on the mini-crossmembers. This therefore imparts great flexibility to the cabin arrangements, including in these areas. Thus it is possible to offer airlines versions of the airframe having an increased seating density, for example an additional passenger per row. For example, this solution makes it possible to offer on a long-haul aircraft with two cabin aisles a three-four-three configuration, i.e. ten seats in the transverse direction, or a three-five-three configuration, i.e. eleven seats in that direction. Thus airlines can be offered at low cost a payload optionally increased by 10%.

Unlike the aforementioned known crossmembers, the mini-crossmembers have multiple bearing points on the beams, notably when they are positioned in the wing box or the main landing gear well, making it possible to have a crossmember the length of which is very much less than the transverse dimension of the fuselage. Accordingly, differing in this respect from the aforementioned known crossmembers, it is not necessary for these mini-crossmembers to bear on lateral portions of the fuselage structure.

In return, these mini-crossmembers make it possible to optimize the position of the longitudinal beams that support them since it is no longer necessary to choose their position allowing for the future position of the seat rails. This therefore optimizes the mass of the fuselage structure, especially in the wing box.

The mini-crossmembers further preserve the transverse flexibility of the fuselage at the level of the wing box and the main landing gear well, in particular in bending about an axis parallel to the longitudinal axis of the fuselage. This preserves the flexibility initially imparted by the links in known aircraft.

At least two of the crossmembers are advantageously aligned in the longitudinal direction of the crossmembers.

Each crossmember advantageously includes a connection to each of the beams that support it, the or each connection including at least one articulation about at least one axis parallel to the direction of the crossmember, preferably two articulations about respective axes parallel to the direction of the crossmember. This flexibility in the direction of the longitudinal axis of the fuselage enables improved distribution of the forces applied to the floor in the structure of the airframe.

It is moreover known that, because of the effect of pressure on the one hand and of flexing of the wings on the other hand, the gantries are entrained by the beams of the wing box and because of this tend to be deformed by pivoting about the longitudinal axis X of the fuselage and moving toward each other. The connection between the beams and each mini-crossmember transmits vertical forces but should not transmit forces caused by unwanted movements such as rotation of the beam. In the aforementioned prior art aircraft, this problem does not arise because the seat rails extend along the axis X and are connected to the beams of the wing box which themselves extend along the axis X. There can therefore be no transmission of flexing torque between the two elements about this axis. Thus it is desirable for the connection between the crossmembers and the underlying structure to transmit vertical forces from the floor to this structure but not to transmit bending movements about the axis X to the floor.

To this end, the connection includes at least one articulation about an axis parallel to the longitudinal direction of the airframe.

Accordingly, the articulation of the connection enables a satisfactory response to this problem by preventing transmission of bending moments about the axis X from the beams to the crossmembers.

The connection advantageously comprises a ball-joint.

Moreover, there are severe overall size constraints for accommodating the landing gear and preserving the volume of the cabin. This is why the height of the assembly formed by the seat rails, the crossmembers, the connections and the beams is limited. It is therefore desirable to render this assembly as compact as possible without compromising the functions and the characteristics of these components, in particular the inertia of the beams and the mini-crossmembers.

To this end, the connection is such that the axis or each axis is below an upper face of the beam.

Faced with the same problem, in another embodiment of the invention the connection is such that the crossmember is connected to the beam by way of an upper wall of the crossmember, the connection lying inside the crossmember.

The connection preferably includes two intermediate parts facing respective opposite faces of the beam and rigidly fixed together by means of two articulations.

BRIEF DESCRIPTION OF THE DRAWINGS

Other features and advantages of the invention will become more apparent in the course of the following description of four embodiments of the invention given by way of nonlimiting example and with reference to the appended drawings, in which.

DETAILED DESCRIPTION

Figure 1:
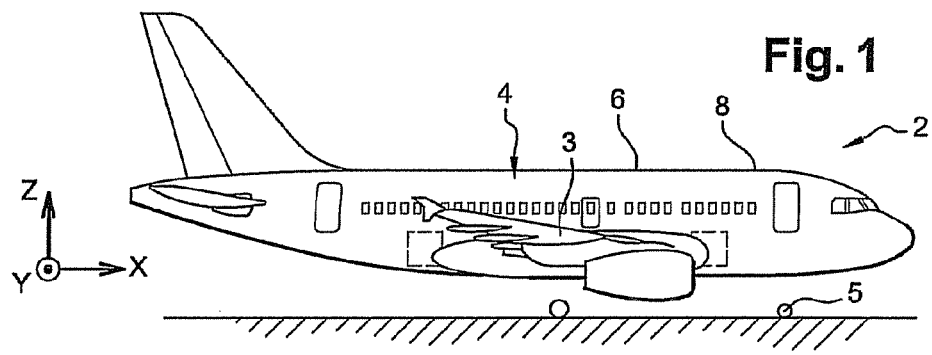
FIG. 1 is a side view of an airframe of the invention.

FIG. 1 shows an airframe 2 of the invention that here is an aircraft including a fuselage 4, landing gear 5 and two wings 3.

Figure 2:
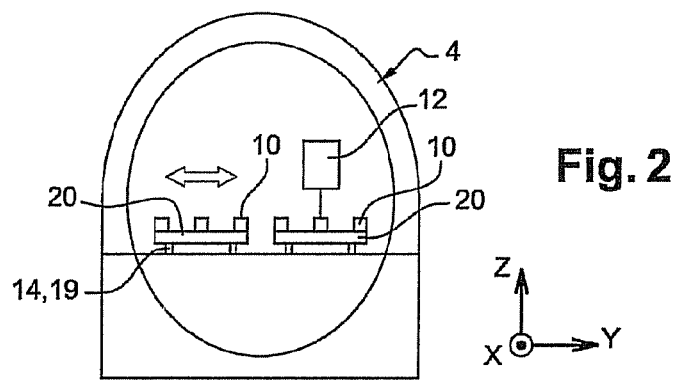
FIG. 2 is a view of the fuselage of the airframe from FIG. 1 in vertical section perpendicular to the longitudinal axis of the fuselage.
Figure 3:
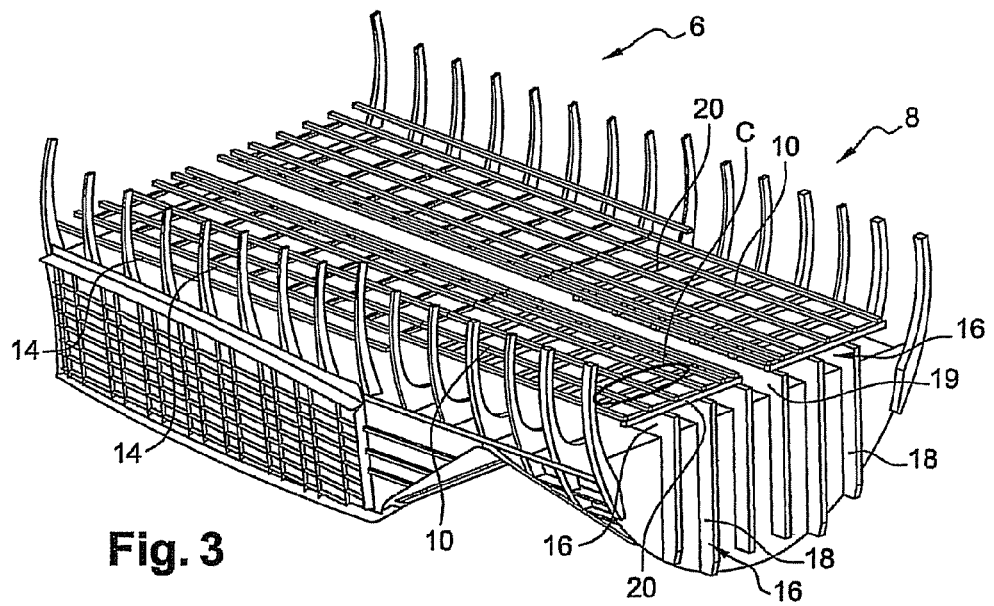
FIG. 3 is a perspective view of part of the internal structure of the fuselage of the airframe from FIG. 1 at the level of the wing box and the main landing gear well 5.

FIGS. 2 and 3 show the structure of the fuselage at the level of the wing box 6, lying between and in line with the wings, and the main landing gear well 8 aft of the wing box 6.

The conventional system of axes XYZ is used hereinafter in which X designates the longitudinal direction of the aircraft and the fuselage, Y the horizontal transverse direction, and Z the vertical direction.

The fuselage of the aircraft 2 includes rails 10 supporting passenger seats 12. The rails are parallel to each other and to the direction X in a common plane parallel to the directions X and Y. The rails of the same section in a plane parallel to the plane YZ are spaced from each other.

The wing box 6 comprises beams 14 parallel to each other and to the direction X in a common plane parallel to the directions X and Y. The beams of the same section in a plane parallel to the plane YZ are spaced from each other.

The main landing gear well 8 comprises flat stiffeners 16 consisting of the assembly of a vertical beam 18 and a horizontal beam 19 each lying in a plane parallel to the plane XZ and together forming a gantry. The beams 19 are parallel to each other in the longitudinal direction X. They lie in the same horizontal general plane parallel to the directions X and Y so that each beam 19 has a height in the direction Z greater than its thickness in the direction Y. The beams 19 of the same section in a plane parallel to the plane YZ are spaced from each other.

The rails 10 and the beams 14 and 19 are straight.

The fuselage structure comprises straight crossmembers 20 formed here by parallel beams that are elongate in the transverse direction Y. The crossmembers are all in the same horizontal plane parallel to the directions X and Y. The crossmembers 20 form aligned rows of crossmembers, the rows extending in the longitudinal direction X. In each row, the crossmembers 20 are also aligned in the longitudinal direction of the crossmembers. Thus in the section of the fuselage shown in FIG. 2, there are two successive crossmembers in the direction Y. Of course, the number of successive crossmembers, i.e. the number of rows, could be higher, for example equal to three, four, five, etc. The crossmembers are spaced from each other in the longitudinal direction X and in the transverse direction Y. The crossmembers are also spaced from the lateral extremities of the fuselage and its structure. Here, the crossmembers are therefore not carried by lateral portions of the fuselage structure.

Each crossmember 20 supports some of the successive rails 10 in the same section in the transverse direction Y but not all of the successive rails.

For example, it can be seen in FIG. 2 that if the number of successive rails in the transverse direction is six, each of the two crossmembers 20 supports only three of the six rails. Moreover, each of the rails 10 in a given section is supported by one and only one crossmember. The rails supported by the same crossmember are spaced from each other.

In a similar way, each crossmember 20 is supported by some of the successive beams 14, 19 in the direction Y in the section concerned but not all of the beams in that section. Here, in the section shown in FIG. 2, each crossmember rests on only two of the beams 14, 19 of the four successive beams in the transverse direction Y. The number of beams supporting each crossmember could be greater than two, for example equal to three, four or five, etc. Each of the beams 14, 19 in the same section supports only one of the crossmembers 20 in the section.

In the more detailed illustration of FIG. 3, each of the two mini-crossmembers 20 in a section supports five of the ten rails 10 in the section and is supported by three of the six beams 19 in the section.

Figure 4:
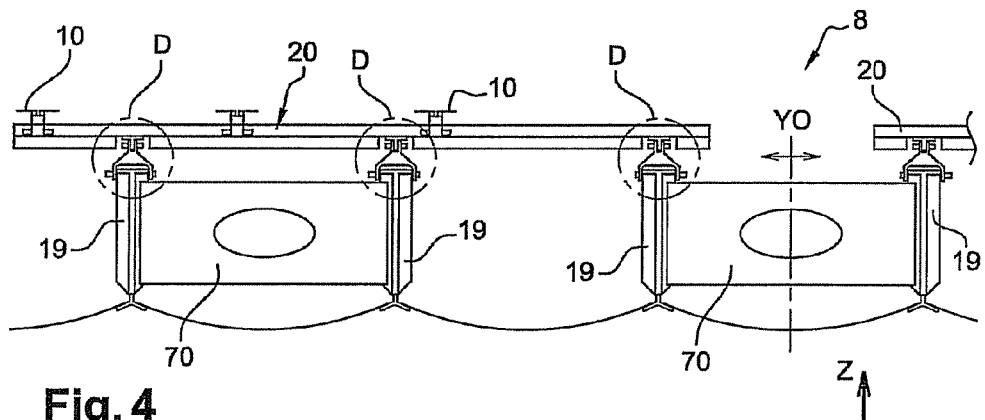
FIG. 4 is a view in elevation of the detail C of the airframe from FIG. 3 showing the arrangement of the mini-crossmembers on the beams in a first embodiment of the invention.
Figure 5:
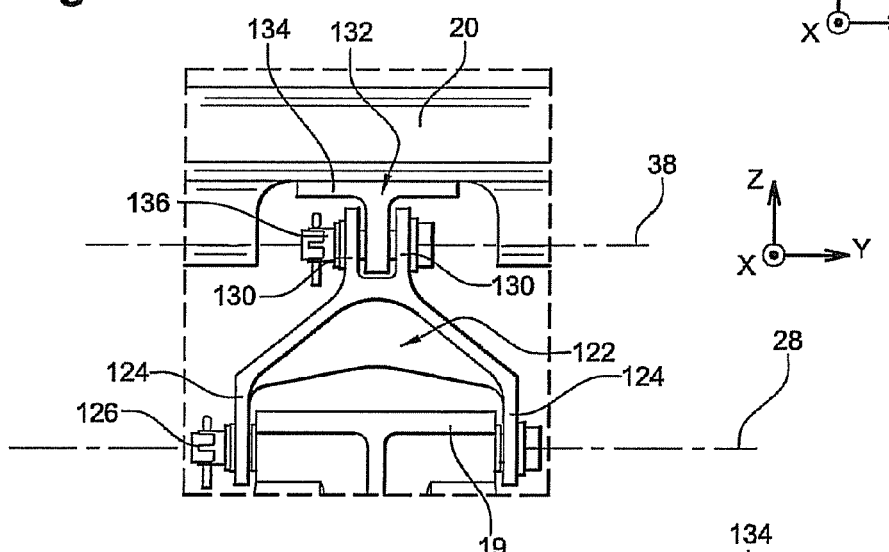
FIG. 5 is a view to a larger scale of the detail D in FIG. 4.
Figure 6:
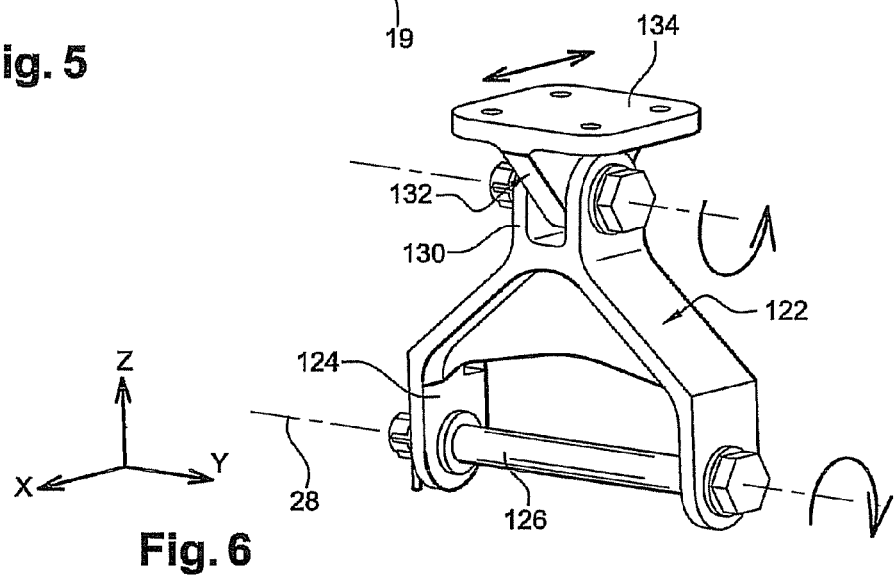
FIG. 6 is a perspective view of the elements of the detail D forming the connection.

A more detailed first version of the FIG. 2 arrangement is described in next with reference to FIGS. 4 to 6. The arrangement of this and subsequent versions is described considering a beam 19 as part of a gantry. The same description would nevertheless apply to a beam 14.

Each of the crossmembers 20 has a mechanical connection to each of the beams 19 on which it rests, which is made up as follows: The connection includes an intermediate part 122 that here is a fork. The lower part of the fork has an inverted "U" or "V" shape so that it forms two branches 124 facing respective opposite main faces of the beam 19.

The connection includes a shaft 126 that passes through the beam 19 and the two branches 124 to form an articulation between the beam 19 and the fork 122 about an axis 28 parallel to the transverse direction Y. The upper end of the fork 122 is also divided into two branches 130 but its width in the transverse direction Y is very much less than that of the lower end of the fork. The two branches 130 lie on respective opposite sides of the lower end of a yoke 132 including an upper plate 134 rigidly fixed to a horizontal wall of the crossmember 20 at a location approximately halfway up the height of the crossmember. A shaft 136 passes through the two branches 130 and the yoke 132 to constitute an articulation between these two parts about an axis 38 that is also parallel to the transverse direction Y. The two rotation axes 28 and 38 allow the yoke 132 to move relative to the associated beam 19 in the longitudinal direction X. The section Y0 that corresponds to the median vertical longitudinal plane of symmetry of the fuselage is shown in the right-hand part of FIG. 4.

Figure 7:
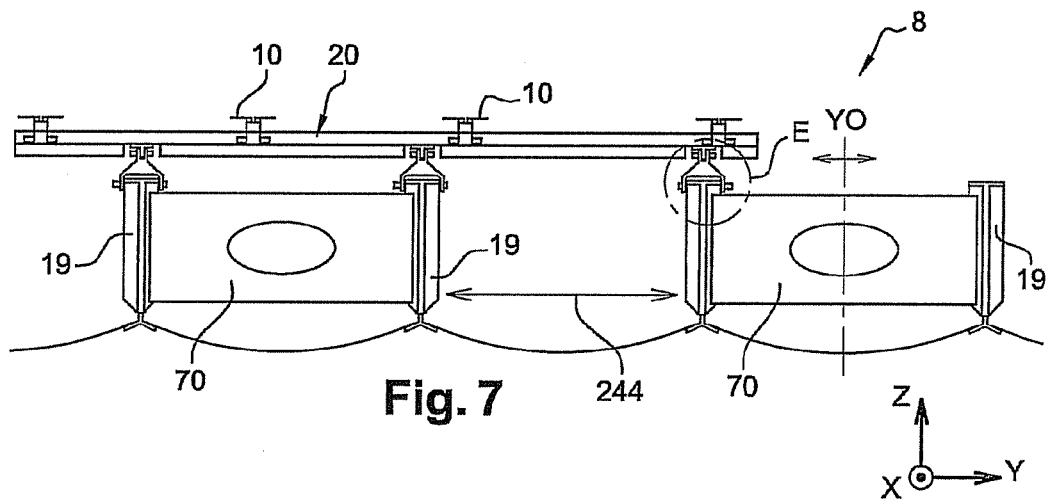
FIGS. 7, 8 and 9 are respectively analogous to FIGS. 4, 5 and 6 and illustrate a second embodiment of the invention.
Figure 8:
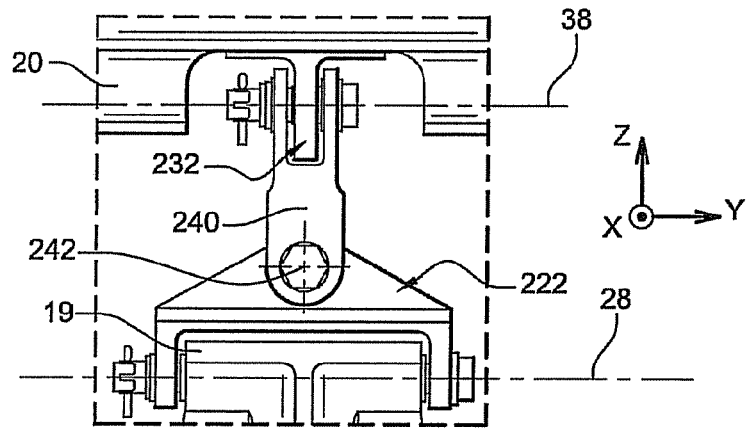
Figure 9:
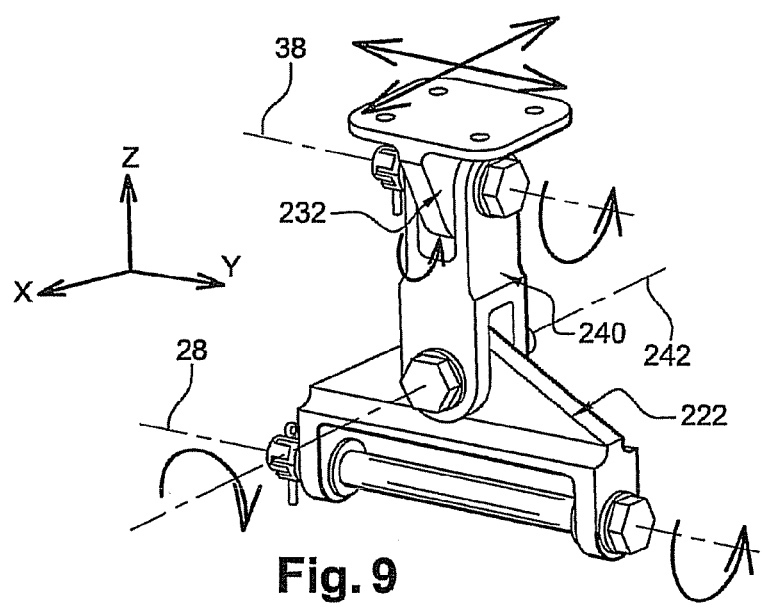
Figure 10:
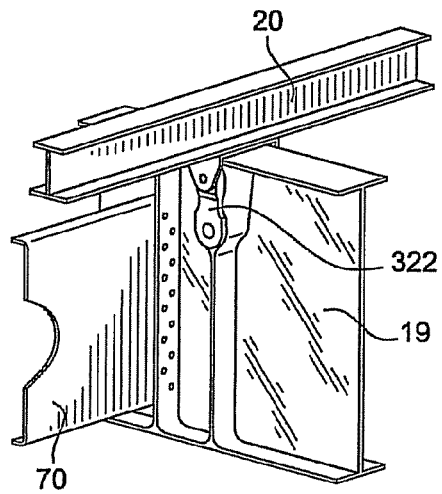
FIG. 10 is a perspective view of the connection between a mini-crossmember and a beam in a third embodiment of the invention.

The second version shown in FIGS. 7 to 9 features a more elaborate version of the connection between each crossmember and each beam that supports it. There is seen again the fork 222 which has a lower end fixed to the beam 19 in the same way as in the first version, defining an articulation about the axis 28. However, the fork is not connected directly to the yoke 232 this time. In this version, the connection includes an intermediate part formed here by a link 240. The link has a lower end articulated to the upper end of the fork 222 to define an articulation or pivot about an axis 242 parallel to the longitudinal direction X. The link 240 has an upper end articulated to the yoke 232 in the same way that the fork 122 is articulated to the yoke 132 in the first version. The link therefore forms an articulation about an axis 38 parallel to the transverse direction Y. Furthermore, the link 240 is articulated to the yoke 232 by means of a ball-joint connection situated between the shaft on the axis 38 and the yoke, for example.

In this second version, the two axes 28 and 38 still allow movement of the yoke 232 relative to the beam 19 in the longitudinal direction X. In this arrangement, however, the link 240 further allows movement of the yoke 232 in the transverse direction Y relative to the beam 19 and its rotation about the axis X. This arrangement allows the mini-crossmember to move in the transverse direction Y, parallel to the upper section of the beam. Accordingly, if the pressure in the cabin generates an effect known as the accordion effect or if certain movements occur at the level of the wing box, it is possible for the beams 19 situated underneath to move toward each other in the direction Y, as indicated by the arrow 244 in FIG. 7. Angular movement of the beam 19 about the axis X relative to the mini-crossmember 20 (and vice versa) is also allowed. The ball-joint connection allows angular movement of the yoke relative to the beam 19 about the axis X. The whole of this connection ensures centering of the forces on the beams 18, 19 and prevent transmission from the beams 18, 19 to the crossmembers 20 of forces tending to deform the beams by causing them to pivot about the axis X and to move toward each other.

A third version that is close in spirit to but more compact than the first version described above is described next. In this version, the fork is divided into two spaced separate parts 322 which here are shackles. Each shackle 322 has a shape close to that of a link, generally flat and plane in the plane XZ, the thickness of the shackle extending in the transverse direction Y. Each of the two shackles 322 has a lower orifice 350 coinciding with an upper orifice 352 of the beam 19. A common shaft that is not shown passes through the three orifices 350 and 352 and defines the axis 28.

Each of the two shackles also has an upper orifice 354. The general shape of the profile of the yoke 332 is that of an inverted "U" defining two branches 356 each of which has an orifice 358. The four orifices 354 and 358 are coaxial and receive a common shaft defining the axis 38. The shaft passes through a cylindrical spacer 360 between the two shackles and coaxial with the orifices 354. It maintains the correct spacing between the two shackles at this level. The two shackles being mobile about the same two rotation axes 28 and 38, they are immobile relative to each other and rigidly fixed to each other indirectly.

Figure 13:
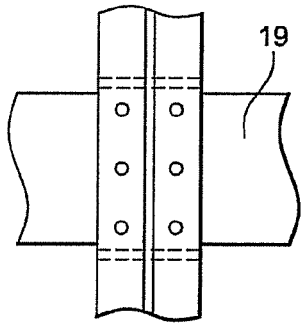
FIGS. 12 and 13 are views of the elements from FIG. 11 in section taken along the lines XII-XII and XIII-XIII, respectively.
Figure 11:
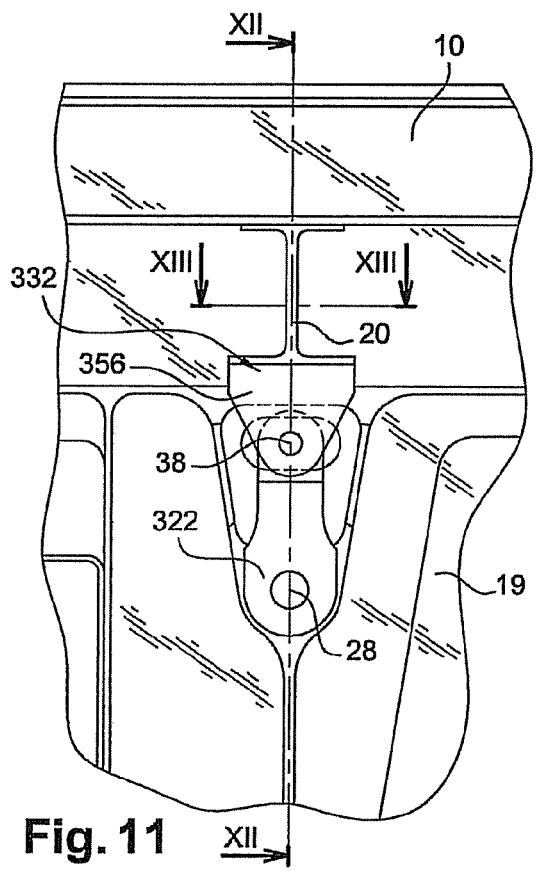
FIG. 11 is a partial view in elevation of the elements from FIG. 10.
Figure 12:
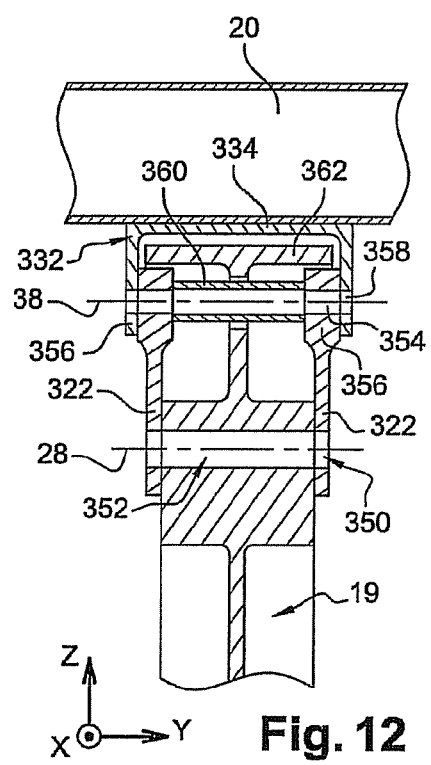

The plate 334 forming the base of the "U" at the top of the yoke is rigidly fixed to the crossmember 20 as before, here to its lower wall. Six fixing points are provided here, as shown in FIG. 13, although this number is not limiting on the invention.

The two shackles 322 lie entirely facing respective opposite faces of the beam 19 under its upper wall 362 that forms the top thereof, in particular under the upper and lower faces of this wall. The two axes 28 and 38 are therefore under the two faces of this wall. The two branches 356 of the yoke 332 extend downwards facing the edges of the wall 362 and the external lateral faces of the upper ends of the respective shackles. The lower face of the plate 334 faces and is parallel to the wall 362, there being a gap between them.

Thus it may be seen that replacing the fork 122 by the two parts 322 makes it possible to dispose the two axes 28 and 38 at the level of the beam 19 and to reduce the overall height of the connection between the beam and the crossmember.

Figure 14:
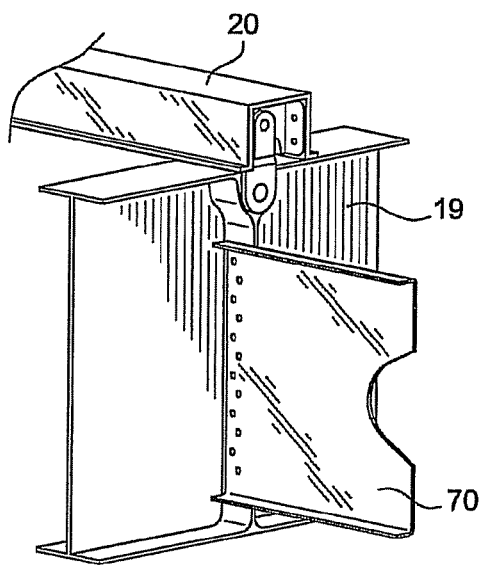
FIGS. 14 to 17 are respectively analogous to FIGS. 10 to 13 and illustrate a fourth embodiment of the invention.
Figure 17:
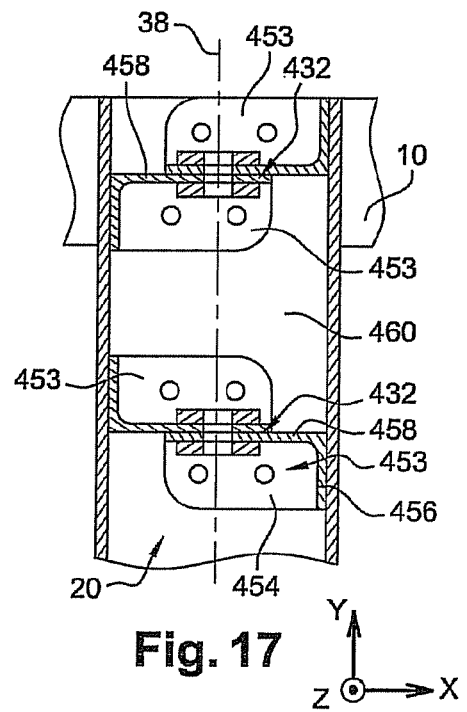
Figure 15:
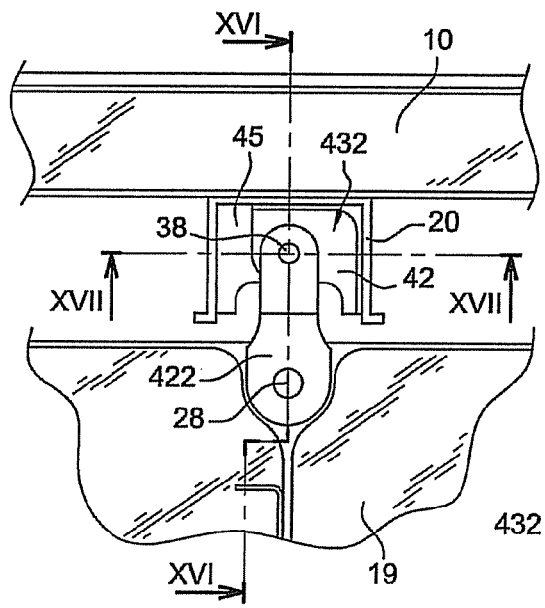
Figure 16:
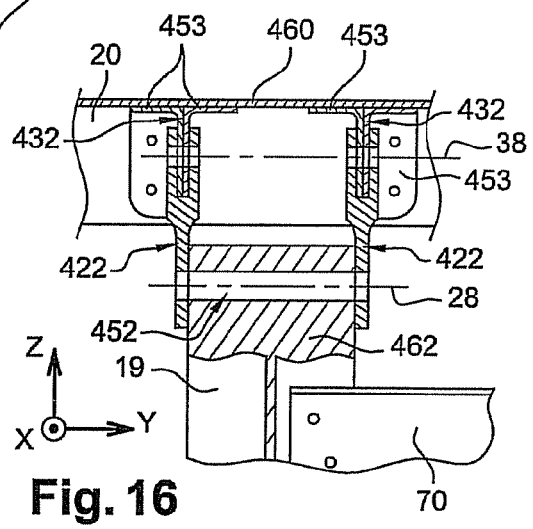

Finally, a fourth version of this connection is described with reference to FIGS. 14 to 16.

In this version, the orifice 452 of the beam 19 is produced in its upper wall 462 but is nevertheless at a distance from the upper face of this wall. Only the lower part of each shackle 422 faces the corresponding lateral wall of the beam 19 as this time the shackles lie above the beam.

The single yoke of the first three versions is replaced this time by two separate yokes 432 that are spaced from each other and associated with the respective shackles 422. Moreover, the upper end of each shackle has a forked shape this time into which the lower end of each yoke 432 is inserted. All six orifices comprising the two upper orifices of each shackle and the orifice of each yoke are coaxial to receive one or two common shafts defining the axis 38.

Moreover, in this version, the crossmember 10 has a section that is open downward. It may be an inverted "U" shape section, but here it is an "a" shape section. The upper plate of each of the yokes 432 is fixed directly to the upper wall 460 forming the top of the crossmember 20, against its internal face. It is therefore clear that the yokes 432 lie below this wall 460. They extend inside the section of the crossmember 20 facing its internal faces. The shackles 422 lie under the yokes and the beam 19 extends under the yokes and partly under the shackles.

Each of the two yokes 432 is itself formed here by two identical parts 453. Each of the parts 453 consists of three walls perpendicular to the directions X, Y and Z, respectively, forming a corner angle bracket with a projecting corner. The horizontal wall 454 is in surface contact with the upper wall 460 of the crossmember 20. The wall 456 lies in the plane YZ and is rigidly fixed to one of the vertical flanks of the crossmember 20. The third wall 458 is parallel to the plane XZ and is fixed to the homologous wall 458 of the other part 453 forming the same yoke so that together they form the lower part of the yoke received in the associated shackle.

The two parts 453 forming the same yoke 432 are fixed to the wall 460 and to respective lateral flanks of the crossmember. They are disposed so as to be mirror images of each other by virtue of a rotation of 180° about the axis Z. On the other hand, the two yokes 432 are disposed to be images of each other by virtue of their symmetry with respect to a plane parallel to the directions X, Z and situated halfway between the two yokes. This version of the yokes enables complex shapes to be imparted to them starting from a common part of simple shape, four of which are used.

Thus the connection lies inside and under the crossmember, but not above it. This version makes it possible to save space by accommodating the connection partly inside the mini-crossmember 20. This is a particularly simple, lightweight and economic solution. For example, it makes it possible to retain for the beam 19 a height of 340 mm, which is a preferred height given the presence of the landing gear wheels beneath and the floor of the cabin above. The open section of "Ω" shape has as much inertia about the axis X as an "I" section and sufficient inertia about the axis Z to take up any shear stress between the rails. This simplification of the fixing of the crossmembers to the beams makes it possible in return to fix stabilizer webs 70 shown in FIGS. 3 and 4 in the vicinity of the connection and in particular in vertical alignment with and below it. Such an arrangement of the webs has the advantage of reducing the machining to be effected and the mass of the beams.

Naturally the third and fourth versions do not impede the movement functions described more generally for the first and second versions. Furthermore, each of the four versions gives rise to no fatigue problems affecting the parts of the fuselage structure.

Of course, many modifications may be made without departing from the scope of invention. Mini-crossmembers could be provided in other areas of the airframe than the wing box and the main landing gear well.

The invention claimed is:

1. An airframe having a substantially circular cross section in a lateral direction (Y) and which extends in a longitudinal direction (X), the airframe comprising:
    a plurality of rails for supporting seats, each rail being parallel to the longitudinal direction (X) of the airframe;
    a plurality of beams parallel to the rails; and
    a plurality of crossmembers aligned in the lateral direction (Y) of the airframe, wherein each crossmember supports only some of the rails in the lateral direction (Y), wherein each crossmember is supported by only some of the beams in the lateral direction (Y) of the airframe, wherein the plurality of beams form part of a wing box or a main landing gear well of the airframe, wherein each crossmember comprises at least one connection to each of the beams supporting each crossmember, and wherein a portion of each connection is adapted to articulate about at least one axis parallel to the lateral direction of the airframe (Y).

2. The airframe as claimed in claim 1, wherein at least two of the crossmembers are aligned in the longitudinal direction (X) of the airframe.

3. The airframe as claimed in claim 1, wherein each connection is adapted to articulate about two axes parallel to the lateral direction of the airframe (Y).

4. The airframe as claimed in claim 1, wherein the connection is adapted to articulate about an axis parallel to the longitudinal direction (X) of the airframe.

5. The airframe as claimed in claim 1, wherein the connection is such that the axis or each axis extends under an upper face of the beam.

6. The airframe as claimed in claim 1, wherein the connection includes a ball-joint.

7. The airframe as claimed in claim 1, wherein the connection is such that the crossmember is connected to the beam by way of an upper wall of the crossmember, the connection lying inside the crossmember.

8. The airframe as claimed in claim 1, wherein the connection includes two intermediate parts facing respective opposite faces of the beam, wherein the two intermediate parts are mobile about two rotation axes but immobile relative to each other.

* * * * *